US011900321B2

(12) United States Patent
Friedland et al.

(10) Patent No.: US 11,900,321 B2
(45) Date of Patent: Feb. 13, 2024

(54) METHOD AND SYSTEM FOR CONTROLLING PRODUCT QUALITY

(71) Applicant: The Boeing Company, Chicago, IL (US)

(72) Inventors: Brittany A. Friedland, Seattle, WA (US); John R. Palmer, Seattle, WA (US); Lucas Aviles, Everett, WA (US); Anthony T. O'Hare, Everett, WA (US); Leanne Jensen, Everett, WA (US); Raluca M. Dumitrache, Everett, WA (US)

(73) Assignee: The Boeing Company, Arlington, VA (US)

( * ) Notice: Subject to any disclaimer, the term of this patent is extended or adjusted under 35 U.S.C. 154(b) by 434 days.

(21) Appl. No.: 16/841,151

(22) Filed: Apr. 6, 2020

(65) Prior Publication Data
US 2021/0312394 A1  Oct. 7, 2021

(51) Int. Cl.
*G06Q 10/101* (2023.01)
*G06Q 10/0639* (2023.01)
(Continued)

(52) U.S. Cl.
CPC .......... *G06Q 10/101* (2013.01); *G06F 30/12* (2020.01); *G06F 30/17* (2020.01); *G06Q 10/06316* (2013.01); *G06Q 10/06395* (2013.01)

(58) Field of Classification Search
None
See application file for complete search history.

(56) References Cited

U.S. PATENT DOCUMENTS 5,586,252 A * 12/1996 Barnard .............. G06F 11/2273
714/48
7,096,082 B1 * 8/2006 Connelly ............. G06Q 10/087
700/109
(Continued)

FOREIGN PATENT DOCUMENTS

EP            2827209 B1 *  1/2022  ......... G05B 23/0243
WO    WO-2004079528 A2 *  9/2004  ......... G06F 17/2235
(Continued)

OTHER PUBLICATIONS

Morris, Mark A. "Failure Mode and Effects Analysis based on FMEA 4th Edition." M and M Consulting (2011). (Year: 2011).*
(Continued)

*Primary Examiner* — Timothy Padot
*Assistant Examiner* — Derick J Holzmacher
(74) *Attorney, Agent, or Firm* — McDonnell Boehnen Hulbert & Berghoff LLP

(57) ABSTRACT

A computer-implemented method includes receiving process information that specifies one or more process requirements and one or more potential causes of failures associated with processes for manufacturing a design, ii) control information that specifies one or more parameters and one or more values associated with the one or more parameters that facilitate determining whether the one or more process requirements specified in the process information that are associated with the processes are being met, and iii) sensor data associated with the one or more parameters from one or more sensors of a product development environment. Responsive to determining that sensor data associated with a particular parameter of the control information is outside of an associated range of values, a process requirement and a process associated with the parameter is determined based on the process information and the control information.

23 Claims, 14 Drawing Sheets

(51) Int. Cl.
  *G06F 30/17*   (2020.01)
  *G06F 30/12*   (2020.01)
  *G06Q 10/0631* (2023.01)

(56) References Cited

U.S. PATENT DOCUMENTS

| | | | | |
|---|---|---|---|---|
| 7,770,052 | B2* | 8/2010 | King | G06F 11/008 |
| | | | | 715/714 |
| 7,818,192 | B2* | 10/2010 | Kymal | G06Q 10/10 |
| | | | | 705/7.38 |
| 7,937,679 | B2* | 5/2011 | Mariani | G06F 30/33 |
| | | | | 716/112 |
| 10,180,995 | B2* | 1/2019 | Jones | G06F 30/20 |
| 2002/0052862 | A1* | 5/2002 | Scott | G06Q 10/087 |
| 2003/0040954 | A1* | 2/2003 | Zelek | G06Q 10/04 |
| | | | | 705/7.29 |
| 2003/0171897 | A1* | 9/2003 | Bieda | G06F 30/00 |
| | | | | 702/185 |
| 2004/0128108 | A1* | 7/2004 | Cutuli | G06F 11/008 |
| | | | | 702/185 |
| 2004/0225475 | A1* | 11/2004 | Johnson | G05B 23/0278 |
| | | | | 702/185 |
| 2006/0253289 | A1* | 11/2006 | Kymal | G06Q 10/06395 |
| | | | | 705/7.41 |
| 2008/0126920 | A1* | 5/2008 | Otaka | G06F 40/268 |
| | | | | 715/200 |
| 2009/0083089 | A1* | 3/2009 | Conchieri | G06Q 10/0635 |
| | | | | 705/7.41 |
| 2009/0299713 | A1* | 12/2009 | Miller | G05B 23/0281 |
| | | | | 706/46 |
| 2012/0253875 | A1* | 10/2012 | Harsh | G06Q 10/06395 |
| | | | | 705/7.15 |
| 2012/0254044 | A1* | 10/2012 | Flanagan | G06Q 10/0631 |
| | | | | 705/301 |
| 2012/0254710 | A1* | 10/2012 | Flanagan | G06Q 10/0631 |
| | | | | 715/202 |
| 2013/0185114 | A1* | 7/2013 | Sadri | G06Q 30/01 |
| | | | | 705/7.26 |
| 2014/0214263 | A1* | 7/2014 | Boucher | G05B 23/0275 |
| | | | | 701/31.8 |
| 2014/0258344 | A1* | 9/2014 | Felke | G06N 5/02 |
| | | | | 707/805 |
| 2015/0025872 | A1* | 1/2015 | Peterson | G06F 11/008 |
| | | | | 703/13 |
| 2015/0032687 | A1* | 1/2015 | vanderZweep | G06Q 10/0631 |
| | | | | 707/609 |
| 2015/0039386 | A1* | 2/2015 | Kymal | G06Q 10/0635 |
| | | | | 705/7.28 |
| 2015/0095101 | A1* | 4/2015 | Kymal | G06F 30/00 |
| | | | | 705/7.28 |
| 2017/0372237 | A1* | 12/2017 | Leao | G06Q 10/067 |
| 2018/0060832 | A1* | 3/2018 | Korsedal, IV | G01M 99/005 |
| 2018/0247239 | A1* | 8/2018 | Horrell | G06N 5/046 |
| 2019/0065491 | A1* | 2/2019 | Nagasaka | G06F 16/93 |
| 2019/0236556 | A1* | 8/2019 | Morisawa | G06Q 10/067 |

FOREIGN PATENT DOCUMENTS

| | | | | |
|---|---|---|---|---|
| WO | WO-2007049013 | A1 * | 5/2007 | G05B 17/02 |
| WO | WO-2015017260 | A1 * | 2/2015 | G06Q 10/0635 |
| WO | WO-2015050625 | A1 * | 4/2015 | G06Q 10/0635 |

OTHER PUBLICATIONS

Kim, Kyungmee O., and Ming J. Zuo. "General model for the risk priority number in failure mode and effects analysis." Reliability Engineering & System Safety 169 (2018): 321-329. (Year: 2018).*

Bahrami, Mahdi, Danial Hadizadeh Bazzaz, and S. Mojtaba Sajjadi. "Innovation and improvements in project implementation and management; using FMEA technique." Procedia-Social and Behavioral Sciences 41 (2012): 418-425. (Year: 2012).*

Karacan, İsmet, et al. "Machine Vision Supported Quality Control Applications in Rotary Switch Production by Using Both Process FMEA and Design FMEA." Natural and Applied Sciences Journal 4.2: 16-31. (Year: 2021).*

Cicek, Kadir, et al. "Risk-based preventive maintenance planning using Failure Mode and Effect Analysis (FMEA) for marine engine systems." 2010 Second International Conference on Engineering System Management and Applications. IEEE, 2010. (Year: 2010).*

Segismundo, Andre, and Paulo Augusto Cauchick Miguel. "Failure mode and effects analysis (FMEA) in the context of risk management in new product development: A case study in an automotive company." International Journal of Quality & Reliability Management 25.9 (2008): 899-912. (Year: 2008).*

Teng, Sheng-Hsien Gary, and Shin-Yann Michael Ho. "Failure mode and effects analysis: an integrated approach for product design and process control." International journal of quality & reliability management (1996). (Year: 1996).*

Švingerová, Michaela, and Martin Melichar. "Evaluation of process risks in industry 4.0 environment." Annals of DAAAM & Proceedings 28 (2017): 1021-1029. (Year: 2017).*

\* cited by examiner

Design failure mode and effects (DFMEA)
400

| ID | Design | Design function | Design requirement | Potential failure mode | Potential effect(s) of failure |
|---|---|---|---|---|---|
| 1 | Jack | Raise car | Car jack lift capacity | Unable to lift car | - Unable to change tire |
| 2 | Jack | Lower car | Tipping resistance | Jack tips over | - User trapped under car<br>- Damage to car |
| ... | | ... | ... | ... | ... |

*Fig. 4A*

DFMEA information (cont'd)
400

| ID | Sev | Classification | Potential cause(s) of failure | Current design prevention controls | OCC | Current design detection controls | Det | SEV * OCC | RPN |
|---|---|---|---|---|---|---|---|---|---|
| 1 | 8 | CI | Threaded rod crack | Stress analisys on rod design | 2 | Material tensile strength tests | 2 | 16 | 32 |
| 2 | 10 | CI | Base too narrow | Statics analysis on jack design | 4 | Simulation | 2 | 40 | 80 |
| ⋮ | ⋮ | ⋮ | ⋮ | ⋮ | ⋮ | ⋮ | ⋮ | ⋮ | ⋮ |

*Fig. 4B*

Process flow
500

| Process step | Process description | Changeover | Classification | Inspection type | Process characteristics | Product characteristics | Control methods |
|---|---|---|---|---|---|---|---|
| 1 | Fasten lower arms to base | Product | SC | | Fastening torque | Pin protrusion | |
| 2 | Fasten upper arms to top | | SC | | Fastening torque | Pin protrusion | |
| 3 | Fasten lower arms to left and right pins | | SC | | Fastening torque | Pin protrusion | |
| ⋮ | ⋮ | ⋮ | ⋮ | ⋮ | ⋮ | ⋮ | ⋮ |

*Fig. 5*

Process failure mode and effects (PFMEA)
700

| ID | Process step | Process description | Process requirement | Potential failure mode | Potential effect(s) of failure |
|---|---|---|---|---|---|
| 1 | 1 | Fasten lower arms to base | Fastening torque | Torque too high | |
| 2 | 1 | Fasten lower arms to base | Pin protrusion | Pin protrusion below strut | - Fatigue failure of jack |
| ... | ... | ... | ... | ... | ... |

*Fig. 7A*

PFMEA information (cont'd)
700

| ID | Sev | Classification | Potential cause(s) of failure | Current process prevention controls | OCC | Current process detection controls | Det | SEV * OCC | RPN |
|---|---|---|---|---|---|---|---|---|---|
| 1 | 8 | SC | Incorrectly set torque wrench | | 5 | | 6 | 40 | 240 |
| 2 | 8 | | Shallow countersink | Integrated counter sink in setter | 3 | Flushness check | 2 | 24 | 48 |
| ... | ... | ... | ... | ... | ... | ... | ... | ... | ... |

*Fig. 7B*

Control plan
800

| ID | PFMEA/ DFMEA ID | Parameter | Sensor ID | Valid values |
|---|---|---|---|---|
| 1 | PFMEA ID 1 | Torque value | Torque sensor 1 | 10-20 ft/lbs |
| 2 | PFMEA ID 2 | Depth value | Depth sensor 1 | 1-2 mm |
| ... | ... | ... | ... | ... |

METHOD AND SYSTEM FOR CONTROLLING PRODUCT QUALITY

BACKGROUND

Field

This application generally relates to design processes. In particular, this application describes a method and system for controlling product quality.

Description of Related Art

Maintaining quality control is an important consideration in a product development cycle. Various quality improvement industry-standard techniques are used across industries to facilitate process improvements, such as Design for Six Sigma and APQP (Advanced Product Quality Planning).

Activities associated with these quality improvement techniques can be time-consuming and can require a significant investment in human resources. For example, the work product produced as a result of these activities can correspond to static documents. In some cases, quality improvement activities associated with a particular product can result in the generation of thousands of documents related to different aspects of the quality improvement activities. This can make it difficult to find documents related to particular quality improvement aspects.

SUMMARY

In a first aspect, a computer-implemented method includes receiving, by a computer, i) process information that specifies one or more process requirements and one or more potential causes of failures associated with processes for manufacturing a design, ii) control information that specifies one or more parameters and one or more values associated with the one or more parameters that facilitate determining whether the one or more process requirements specified in the process information that are associated with the processes are being met, and iii) sensor data associated with the one or more parameters from one or more sensors of a product development environment. The method includes, responsive to determining that sensor data 135c associated with a particular parameter of the control information is outside of an associated range of values, determining, by the computer and based on the process information and the control information, a process requirement and a process associated with the parameter. The computer communicates, to a terminal, a user interface that indicates the process associated with the parameter.

In a second aspect, a system includes a memory and a processor. The memory stores instruction code. The processor is in communication with the memory. The instruction code is executable by the processor to cause the processor to perform operations that include receiving i) process information that specifies one or more process requirements and one or more potential causes of failures associated with processes for manufacturing a design, ii) control information that specifies one or more parameters and one or more values associated with the one or more parameters that facilitate determining whether the one or more process requirements specified in the process information that are associated with the processes are being met, and iii) sensor data 135c associated with the one or more parameters from one or more sensors of a product development environment. The processor, responsive to determining that sensor data 135c associated with a particular parameter of the control information is outside of an associated range of values, determines, based on the process information and the control information, a process requirement and a process associated with the parameter. The processor communicates, to a terminal, a user interface that indicates the process.

In a third aspect, a non-transitory computer-readable medium having stored thereon instruction code is provided. When the instruction code is executed by a processor, the processor performs operations that include receiving i) process information that specifies one or more process requirements and one or more potential causes of failures associated with processes for manufacturing a design, ii) control information that specifies one or more parameters and one or more values associated with the one or more parameters that facilitate determining whether the one or more process requirements specified in the process information that are associated with the processes are being met, and iii) sensor data 135c associated with the one or more parameters from one or more sensors of a product development environment. The processor, responsive to determining that sensor data 135c associated with a particular parameter of the control information is outside of an associated range of values, determines, based on the process information and the control information, a process requirement and a process associated with the parameter. The processor communicates, to a terminal, a user interface that indicates the process.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 4A illustrates a DFMEA table that facilitates specification of DFMEA information for a particular design, in accordance with an example.

FIG. 4B illustrates additional fields of the DFMEA, in accordance with an example.

FIG. 5 illustrates a process flow table that facilitates the specification of process flow information associated with the design, in accordance with an example.

FIG. 7A illustrates a PFMEA table that facilitates specification of PFMEA information associated with the design, in accordance with an example.

FIG. 7B illustrates additional fields of the PFMEA table, in accordance with an example FIG. 8 illustrates a control plan table that facilitates specification of control plan information associated with the design, in accordance with an example.

DETAILED DESCRIPTION

Figure 1:
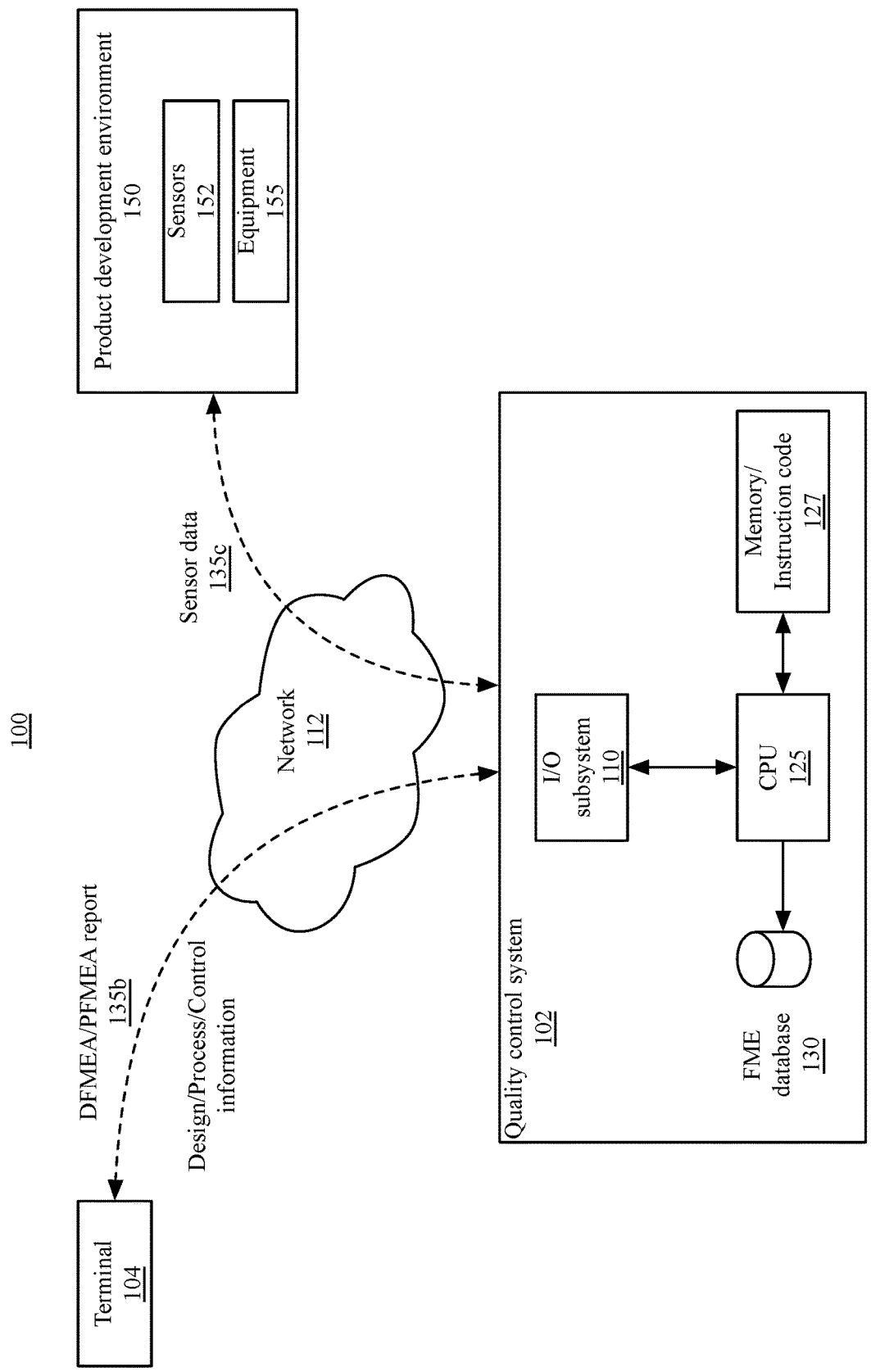
FIG. 1 illustrates an environment that includes various systems/devices that facilitate implementation of quality control procedures, in accordance with an example.

Implementations of this disclosure provide technological improvements that are particular to computer technology, such as those related to the processing of quality control information that can span thousands of files. Computer-specific technological problems such as how to reduce memory utilization of a quality control computer system are overcome by, for example, organizing quality control information in a memory efficient manner to facilitate implementation of various quality control procedures. In this regard, in the examples, various aspects of quality control information can be represented in memory using an object graph. A user interface that facilitates specifying aspects of quality control information can be configured to operate in cooperation with the object graph to encourage users to enter previously specified quality control information rather than create new quality control information, which can be redundant. Thus, a reduction in the amount of memory required by a system to implement quality control procedures can be realized by implementations disclosed herein.

The systems and methods of the present disclosure further address problems particular to computer networks, such as those related to retrieval of quality control information that can span thousands of files that are stored across numerous networked quality control information servers. These computing network-specific issues can be solved by implementations of the present disclosure by organization quality control information in an object graph and encouraging reuse of information stored in the object graph. This, in turn, reduces duplicative information and therefore the amount of information that may otherwise be necessary to retrieve via the network. Thus, a reduction in the amount of network traffic can be realized by implementations disclosed herein.

Thus, specification of quality control information and adherence to corresponding quality control procedures can be performed in a more cost effective manner, requiring fewer computing resources, and less manpower.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

I. Introduction

As noted above, maintaining quality control is an important consideration in a product development cycle. Design Failure Mode and Effects Analysis (DFMEA) and Process Failure Mode and Effects Analysis (PFMEA) are additional industry-standard techniques that can be used to improve quality in a design. Both DFMEA and PFMEA involve identifying failure modes and the effects of failure modes associated with various aspects of a design or processes for manufacturing the design. The failure modes and effects can be scored according to severity, predicted occurrence rate, and detectability. An overall score can be calculated based on these scores to assess whether further steps should be taken to reduce the likelihood of failure.

Reducing the likelihood of a failure can involve making design changes, process changes, and/or improving the detectability of the potential failures. In some cases, a control plan can be established to help mitigate issues that can lead to failures in the design and/or processes. The control plan can specify, for example, measurable aspects related to the design and/or the processes that can be used to assess whether the design and/or processes are meeting specific requirements.

Described below is an example of a system, and method implemented by the system, that facilitates specifying DFMEA information and PFMEA information, and digitally linking the information to a control plan. The system can receive information from sensors of a product development environment and can compare the information to information specified in the control plan. Information in the control plan can facilitate assessing whether requirements specified in the DFMEA information and/or the PFMEA information are being met. The system can alert an operator to a problem associated with a particular entry in the control plan. Digital linkage between the control plan and the PFMEA information and the DFMEA information can facilitate tracing the problem to a specific requirement specified in the PFMEA information or the DFMEA information.

FIG. 1 illustrates an example of an environment 100 that includes various systems/devices that facilitate implementation of quality control procedures. Example systems/devices of the environment 100 include a quality control system (QCS) 102, a terminal 104, and a product development environment (PDE) 150. The various entities of the environment 100 can be configured to communicate with one another via a network 112, such as the Internet.

An example of the PDE 150 can correspond to a factory that manufactures a device. The PDE 150 can include one or more lines for manufacturing the device, and these lines can include equipment 155 for performing various manufacturing processes. Sensors 152 can be provided on the line to measure different aspects associated with the different processes. For example, sensors 152 can be provided to measure various temperatures, pressures, lengths, speeds, etc. that can facilitate determining whether particular processes are being performed correctly. The sensors 152 can be in communication with one or more computer systems of the PDE 150, which can communicate sensor data 135c to systems outside of the PDE 150, such as the QCS 102.

An example of the QCS 102 can correspond to a computer, tablet, and/or any other device that facilitates user interactions. The QCS 102 can include a memory 127 and a processor 125. The QCS 102 can include other subsystems. Within examples, these subsystems can include an input/output (I/O) subsystem 110 and a failure mode and effects (FME) database 130. Details related to the various subsystems of the QCS 102 and the operations performed by these subsystems are described in further detail below.

The processor 125 is in communication with the memory 127. The processor 125 is configured to execute instruction code stored in the memory 127. The instruction code facilitates performing, by the QCS 102, various operations that facilitate implementation of quality control procedures. In this regard, the instruction code can cause the processor 125 to control and coordinate various activities performed by the different subsystems of the QCS 102. The processor 125 can correspond to a stand-alone computer system such as an Intel®, AMD®, or PowerPC® based computer system or a different computer system and can include application-specific computer systems. The computer system can include an operating system, such as Microsoft Windows®, Linux, Unix®, Apple IOS®, Android®, or a different operating system.

An example of the I/O subsystem 110 can include one or more input, output, or input/output interfaces and is configured to facilitate communications with entities outside of the QCS 102. For example, the I/O subsystem 110 can facilitate communications with the PDE 150 and the terminal 104. In this regard, an example of the I/O subsystem 110 can be configured to dynamically determine the communication methodology utilized by entities of the environment 100 and can communicate information to the entities with an interface that uses a determined communication methodology. For example, the I/O subsystem 110 can determine that a first entity utilizes a RESTful API and can, therefore, communicate with the entity using an interface that uses a RESTful communication methodology.

An example of the I/O subsystem 110 can include a wireless interface that facilitates wirelessly communicating with entities of the environment 100. Within examples, the wireless interface can include an 802.11 based interface, a Bluetooth® interface, a cellular interface, a near field communication interface, and/or a different type of wireless interface. The cellular interface can be configured to implement various cellular telephone standards such as a 3G, 4G, LTE, 5G, etc. It is contemplated that the cellular telephone standard could include and/or implement a yet to be developed wireless standard for communicating information between devices.

An example of the terminal 104 can correspond to a computer, mobile device, tablet, and/or any other device that facilitates user interactions. The terminal 104 can include a memory and a processor. The terminal 104 can include other subsystems. Within examples, these subsystems can include an input/output (I/O) subsystem, a display, a keyboard, a mouse, etc.

It is contemplated that any of the subsystems referenced herein can correspond to a stand-alone computer system such as an Intel®, AMD®, or PowerPC® based computer system or a different computer system and can include application-specific computer systems. The computer systems can include an operating system, such as Microsoft Windows®, Linux, Unix®, or another operating system. It is also contemplated that operations performed on the various subsystems can be combined into a fewer or greater number of subsystems to facilitate speed scaling, cost reductions, etc.

Figure 2:
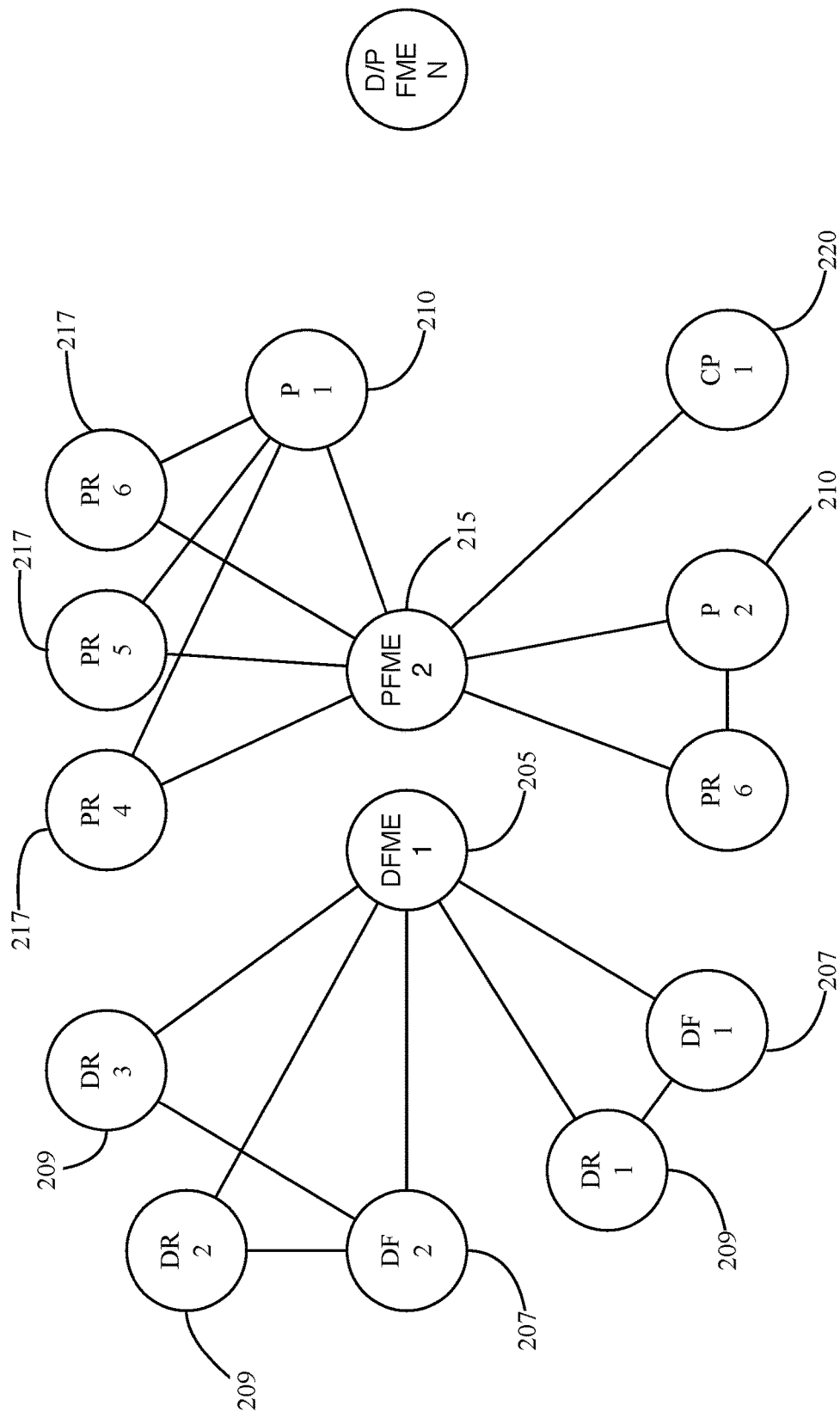
FIG. 2 illustrates a failure mode and effects (FME) object graph 200 that can be stored in an FME database of a quality control system (QCS) of the environment, in accordance with an example.

FIG. 2 illustrates an example of a failure mode and effects (FME) object graph 200 that can be stored in the FME database 130. The FME object graph 200 includes nodes and edges that can represent design failure mode and effects (DFMEA) information (400, FIG. 4), process information (500, FIG. 5), process failure mode and effects (PFMEA) information (700, FIG. 7), and control plan information (800, FIG. 8). For example, entities of the FME object graph 200 that can represent DFMEA information can include design failure mode and effect (DFME) nodes 205, design function (DF) nodes 207, design requirement (DR) nodes 209, and the edges therebetween. Entities of the FME object graph 200 that can represent process information can include process (P) nodes 210. Entities of the FME object graph 200 that can represent PFMEA information can include process failure mode and effect (PFME) nodes 215, P nodes 210, process requirement (PR) nodes 217, and the edges therebetween. Entities of the FME object graph 200 that can represent control plan information can include control plan (CP) nodes 220.

Figure 3:
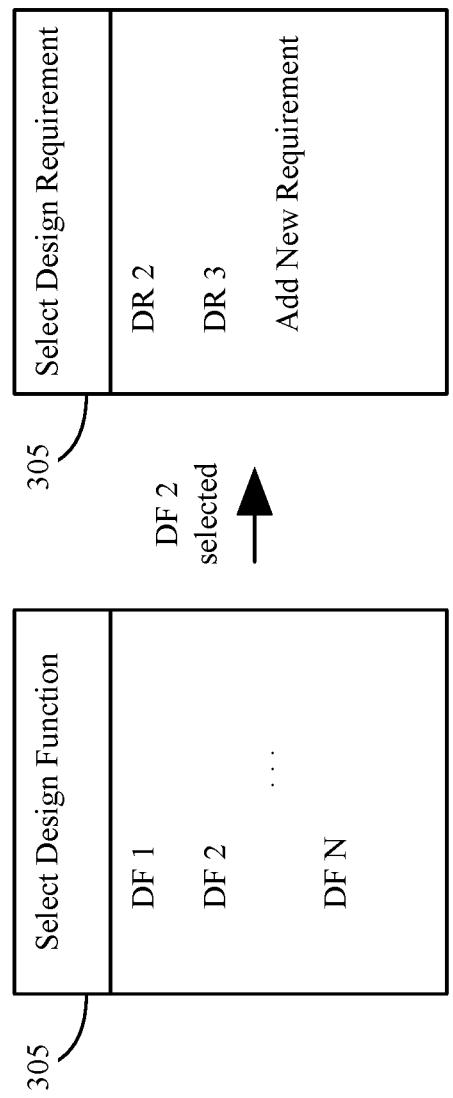
FIG. 3 illustrates a user interface control that can facilitate specifying Design Failure Mode and Effects (DFMEA) information and Process Failure Mode and Effects (PFMEA) information, in accordance with an example.

FIG. 3 illustrates an example of a user interface control 305 that can facilitate specifying the DFMEA information and the PFMEA information for a particular design based on DFMEA information and PFMEA information previously-stored/specified in the object graph 200. In particular, the user interface control 305 can be used in connection with a DFMEA table (400, FIG. 4) and a PFMEA table (700, FIG. 7) (described in more detail below) that can be used to specify DFMEA information and PFMEA information for a particular design.

For example, in operation, a user can select a design function field (405c, FIG. 4) for a particular entry in the DFMEA table 400, which can cause the user interface control 305 to be presented. The user interface control 305 can list different design functions such as DF 1, DF 2, etc. The listed design functions can correspond to the DF nodes 207 specified in the object graph 200.

After the user selects a particular design function (e.g., DF 2), the selected design function can be specified in the design function field 405c for the entry. The user can then select the requirement field (405d, FIG. 4) for the entry. The user interface control 305 can then be updated list requirements specified in the object graph 200 to be related the specified design function. Following the example above, the user interface control 305 can be updated to list design requirements DR 2 and DR 3, which are specified in the object graph 200 to be related to DF 2.

Similar operations can be performed to specify values for other fields of the DFMEA table 400. Values listed in the user interface control 305 can correspond nodes, as used in the examples above, or attributes of the nodes. Thus, by presenting various previously specified values, the user interface control 305 encourages the user to reuse previously specified design functions, design requirements, and other previously specified attributes rather than specifying new values, which can be redundant. This, in turn, can reduce memory requirements associated with particular DFMEA information.

Some examples of the user interface control 305 can include a field that facilitates specifying custom values. Upon specifying a custom value, the object graph 200 can be updated. For example, following the example above, the user can choose to specify a new design requirement (e.g., DR 3). In this case, a new node can be added to the object graph 200 to represent DR 3, and an edge can connect the new node to, for example, the DF node 207 (e.g., DF 2) to indicate a relationship between the new requirement and the design function.

FIGS. 4A and 4B illustrate an example of a DFMEA table 400 that can be presented to a user to facilitate the specification of DFMEA information for a particular design. Each entry in DFMEA table 400 can specify various failure modes and effects of those failures that are associated with different design functions to be performed by a particular design. Within examples, fields 405 of each entry in the DFMEA table 400 can include an ID field 405a, a design field 405b, a design function field 405c, a design requirement field 405d, a potential failure mode field 405e, a potential effects of failure field 405f, an SEV field 405g, a classification field 405h, a potential causes of failure field 405i a current design prevention control field 405j, an OCC field 405k, a current design detection control field 405l, a DET field 405m, an SEV*OCC field 405n, and an RPN field 405o. Other information can be specified in the DFMEA table 400. As described further below, values associated with some of the fields can be specified by nodes in the object graph 200. Other values can be specified by attributes of a particular node.

The ID field 405a of each entry can specify a unique value for each entry. The ID field 405 can be used to link a particular entry in the DFMEA table 400 to entries in other tables such as a PFMEA table (500, FIG. 5) and a control plan table (800, FIG. 8). The value of the ID field 405 can be automatically generated with each new entry in the DFMEA table 400. Additionally, or alternatively, the value for the ID field 405 can be manually specified.

The design field 405b of each entry can specify a name for a particular design such as "Jack". In this regard, the value can be manually specified by a user and can be used to group entries within the DFMEA table 400. This can facilitate searching the DFMEA table 400 for entries associated with the same design.

The design function field 405c and the design requirement field 405d of each entry can specify, respectively, a particular design function that is expected to be performed by the design and a particular requirement that is associated with the design function. The values for the design function field 405c and the design requirement field 405d can be specified by a DF node 207 and a DR node 209, respectively, previously stored in the object graph 200.

The classification field 405h of each entry can specify special requirements such as a Key Characteristic (KC), Critical Items (CI), or items requiring additional design or process controls. The value for this field can correspond to an attribute specified in a PR node 209 and can be automatically specified upon specification of a value for the design requirement field 405d.

The potential causes of failure field 405i of each entry can specify a particular cause of a failure that can occur when the requirement specified in the entry is not met. The value for the potential causes of failure field 405i can be specified by a DFME node 205 previously stored in the object graph 200.

The potential failure mode field 405e, potential effects of failure field 405f, current design prevention control field 405j, and current design detection control field 405l of each entry can specify, respectively, a particular failure mode, one or more potential effects of failure, a current design prevention control, and a current design detection control associated with a failure to meet the requirement specified in the entry. Respective values for each of these fields can correspond to attributes of the DFME node 205.

As noted above, the user interface control 305 can be utilized to select previously specified values associated with one or more of these fields that can be stored in the object graph 200. Alternatively, a new value for one or more of these fields can be specified via the user interface control 305. A new node (i.e., DF, DR, or DFME node) can be created and added to the object graph 200 when a new design function, design requirement, and/or potential cause of failure value is specified. The new node(s) can be indicated to be related to other nodes associated with the DFMEA entry via edges. New values for other fields can be specified as attributes of nodes that are associated with the DFMEA entry (i.e., DF, DR, or DFME nodes).

The SEV (failure severity rating) field 405g, OCC (failure occurrence frequency) field 405k, and DET (failure detection rating) field 405m can be manually specified by the user in the DFMEA table 400. Values for each of these fields can correspond to a number between, for example, 1 and 10. In some examples, selecting a particular field in the DFMEA table 400 can cause a dropdown box control to be depicted, which can facilitate the selection of one of these values.

The SEV*OCC field 405n, and an RPN (risk priority number) field 405 can be automatically calculated based on the values specified in the SEV, OCC, and DET fields. The SEV*OCC value can correspond to the product of the SEV and OCC values. The RPN value can correspond to the product of the SEV, OCC, and DET values.

FIG. 5 illustrates an example of a process flow table 500 that can be presented to a user to facilitate the specification of process flow information for a particular design. Each entry in the process flow table 500 can correspond to a P node 210 specified in the object graph 200 and can be associated with a particular process that is required to be performed to manufacture the design. Within examples, fields 505 of each entry in the process flow table 500 can include a process step field 505a, a process descriptor field 505b, a changeover field 505c, a classification field 505d, an inspection type field 505e, a process characteristics field 505f, a product characteristics field 505g, and a control methods field 505h. Values for each of the fields can be manually specified by the user.

The process step field 505a of each entry can specify the order in which a particular process is to be performed. For example, the value specified can correspond to one to indicate the process is the first process to be performed, two to indicate that the process step is the second step to be performed, etc.

The process descriptor field 505b of each entry can specify the purpose and intent of the process.

The changeover field 505c of each entry is optional and can be used to specify a disruption in the way the work is to be performed. The disruption can be related to changes in tooling, software, or other aspects related to product manufacturing.

The classification field 505d of each entry can specify a unique ID for special requirements such as a key characteristic (KC), critical items (CI), or items requiring additional design or process controls.

The inspection type field 505e of each entry can be used to indicate whether the entry corresponds to a process that evaluates the product for conformance to specifications (e.g., visual inspection, functional testing, automatic gauging, etc.).

The process characteristics field 505f of each entry can specify a brief description of characteristics associated with the process.

The control methods field 505h of each entry can specify a brief description of existing prevention and detection control methods.

Figure 6:
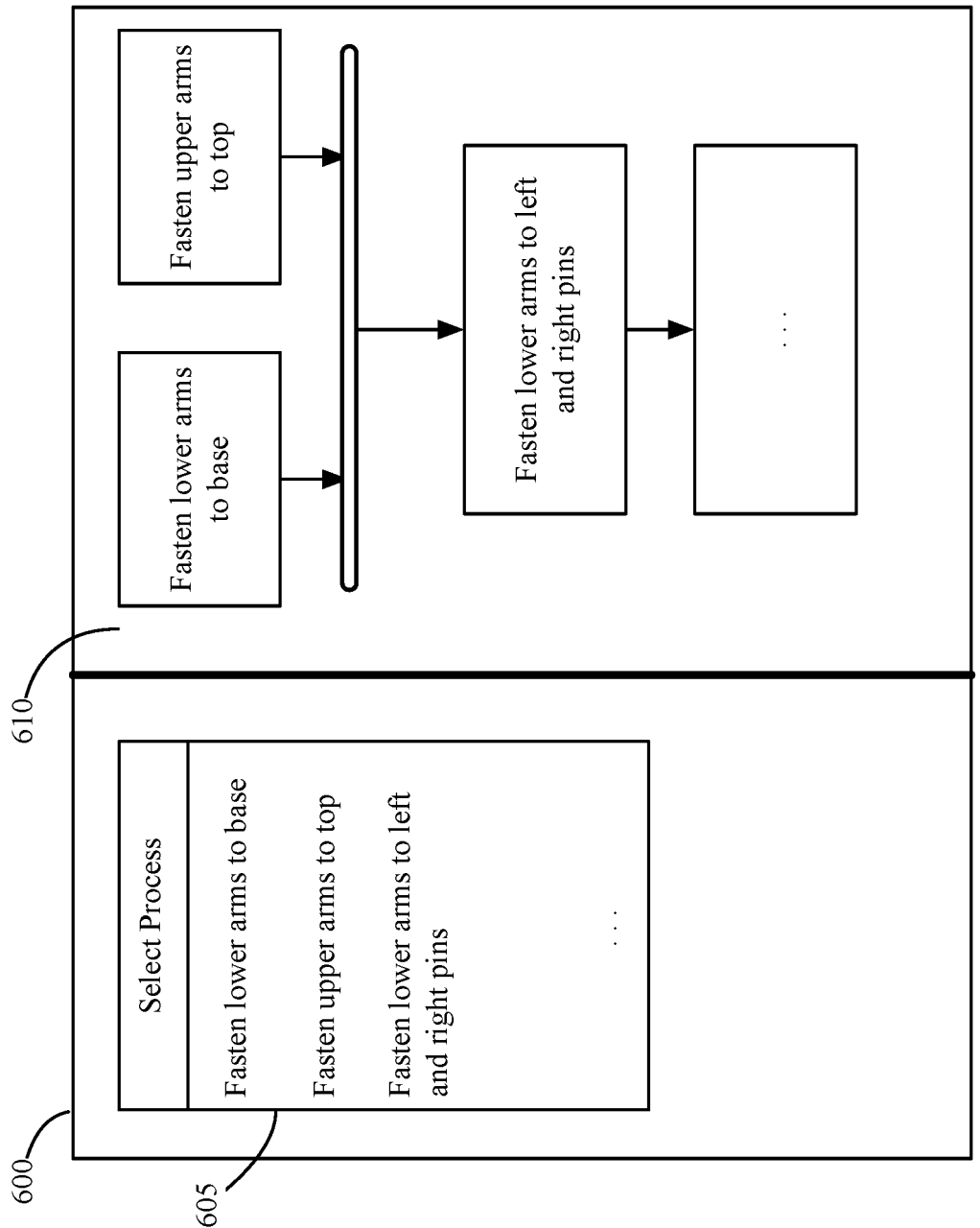
FIG. 6 illustrates a process flow diagram (PDF) control that facilitates visualization of the order in which processes involved in the manufacturing of the design can be performed, in accordance with an example.

FIG. 6 illustrates an example of a process flow diagram (PDF) control 600 that facilitates visualization of the order in which processes involved in the manufacturing of the design can be performed. Referring to the figure, the PDF control 600 can include a process selection control 605 and a visualizer 610. The process selection control 605 can list the various processes specified in the process flow table 500.

In operation, the user can drag processes listed in the process selection control 605 to the visualizer 610. Afterward, a visualized representation of a selected process (e.g., a box that specifies the description field 505b associated with the process) can be depicted in the visualizer 610. The user can continue to drag and drop processes to the visualizer 610 and can move the visualized representations of the processes around the visualizer 610 in a meaningful way to visually convey the order in which the processes are performed in the manufacturing of the design. The PDF control 600 can include additional controls that facilitate drawing lines between blocks and depicting other aspects that can further facilitate visualization of the processes involved in the manufacturing of the design.

FIGS. 7A and 7B illustrate an example of a PFMEA table 700 that can be presented to a user to facilitate the specification of PFMEA information for a particular design. Each entry in PFMEA table 700 can specify a process, and the process can correspond to one of the processes specified in the process flow table 500. Each entry can further specify various failure modes, and effects of those failures, associated with the process. In this regard, within examples, fields 705 of each entry in the PFMEA table 700 can include an ID field 705a, a process step field 705b, a process descriptor field 705c, a process requirement field 705d, a potential failure mode field 705e, a potential effects of failure field 705f, an SEV field 705g, a classification field 705h, a potential causes of failure field 705i a current process prevention control field 705j, an OCC field 705k, a current process detection control field 705l, a DET field 705m, an SEV*OCC field 705n, and an RPN field 705o. Other information can be specified in the PFMEA table 700. As described further below, values associated with some of the fields can be specified by nodes in the object graph 200. Other values can be specified by attributes of a particular node.

The ID field 705a of each entry can specify a unique value for each entry. The ID field 705a can be used to link a particular entry in the PFMEA table 700 to entries in other tables such as a DFMEA table 400 and the control plan table 800. The value of the ID field 705a can be automatically generated with each new entry in the PFMEA table 700. Additionally or alternatively, the value for the ID field 705a can be manually specified.

The process step field 705b and the process descriptor field 705c can respectively specify the order in which a particular process is to be performed and the intent of the process. In some examples, the user can be automatically prompted to specify values for these fields upon generating a new entry in the PFMEA table 700. For example, after generating the new entry, the user interface control 305 described above can be presented to the user and can list the various processes specified in the process flow table 500. Processes listed can correspond to the P nodes 210 specified in the object graph 200. Selection of one of the listed processes can cause the process step field 705b and the process descriptor field 705c to be populated with the corresponding process step and process description associated with the selected process (i.e., P node 210). In some examples, values for these fields can be manually specified in the PFMEA table 700.

The process requirement field 705d of each entry can specify a requirement expected to be met in performing the process associated with the entry. The values for the process requirement field 705d can be specified by a PR node 217 in the object graph 200.

The potential causes of failure field 705i of each entry can specify a particular cause of a failure that can occur when the requirement specified in the entry is not met. The value for the potential causes of failure field 705i can be specified by a PFME node 215 in the object graph 200.

The classification field 705h of each entry can specify special requirements such as a Key Characteristic (KC), Critical Items (CI), or items requiring additional design or process controls. The value for this field can correspond to an attribute specified in a PR node 217 and can be automatically specified upon specification of a value for the process requirement field 705d.

The potential failure mode field 705e, potential effects of failure field 705f, current process prevention control field 705j, and current process detection control field 705l of each entry can specify, respectively, a particular failure mode, one or more potential effects of failure, a current process prevention control, and a current process detection control associated with a failure to meet the requirement specified in the entry. Respective values for each of these fields can correspond to attributes of the PFME node 215.

As with the DFMEA table 400, the user interface control 305 described above can be utilized to select previously specified values associated with one or more of the fields of the PFMEA table 700 that can be stored in the object graph 200. Alternatively, a new value for one or more of these fields can be specified via the user interface control. A new node (i.e., P, PR, or PFME node) can be created and added to the object graph 200 when a new process, process requirement, and/or potential cause of failure value is specified. The new node(s) can be indicated to be related to other nodes associated with the PFMEA entry via edges. New values for other fields can be specified as attributes of nodes that are associated with the PFMEA entry (i.e., P, PR, or PFME nodes).

The SEV (failure severity rating) field 705g, OCC (failure occurrence frequency) field 705k, and DET (failure detection rating) field 705m can be manually specified by the user in the DFMEA table. Values for each of these fields can correspond to a number between, for example, 1 and 10. In some examples, selecting a particular field in the PFMEA table can cause a dropdown box control to be depicted, which can facilitate the selection of one of these values.

The SEV*OCC field 705n, and an RPN (risk priority number) field 705 can be automatically calculated based on the values specified in the SEV, OCC, and DET fields. The SEV*OCC value can correspond to the product of the SEV and OCC values. The RPN value can correspond to the product of the SEV, OCC, and DET values.

FIG. 8 illustrates an example of a control plan table 800 that can be presented to a user to facilitate the specification of control plan information. Each entry in the control plan table 800 can correspond to a CP node 220 specified in the object graph 200 and can be associated with a particular entry in the PFMEA table 700 or a particular entry in the DFMEA table 400. In this regard, within examples, fields 705 of each entry in the control plan table 800 can include an ID field 805a, a PFMEA/DFMEA ID field 805b, a parameter field 805c, a sensor field 805d, and a valid values field 805e. Other information can be specified in the control plan table 800. Values associated with the fields can be specified as attributes of a CP node 220.

The ID field 805a of each entry can specify a unique value for each entry. The ID field 805a can be used to link a particular entry in the control plan table 800 to entries in the other tables described above. The value of the ID field 705a can be automatically generated with each new entry in the control plan table 800. Additionally, or alternatively, the value for the ID field 805a can be manually specified.

The PFMEA/DFMEA ID field 805b of each entry can specify the ID associated with an entry in either the PFMEA table 700 or the DFMEA table 400. Specification of an ID facilitates linking/associating the entry in the control plan table 800 to an entry in the PFMEA table 700 or the DFMEA table 400, and therefore a process or a design function.

The parameter field 805c of each entry can specify the type of parameter associated with a particular entry. For example, the parameter can be temperature, pressure, distance, etc.

The sensor field 805d of each entry can specify information that uniquely identifies a particular sensor 152 of the PDE 150. For example, the value can correspond to a network address uniquely associated with the sensor 152. The sensor 152 can be configured to obtain data from equipment of the PDE 150 that is associated with a particular process such as the temperature, pressure, etc. associated with the process.

The valid values field 805e of each entry can specify ranges of values that can facilitate determining whether a particular process is being performed correctly.

Figure 9A:
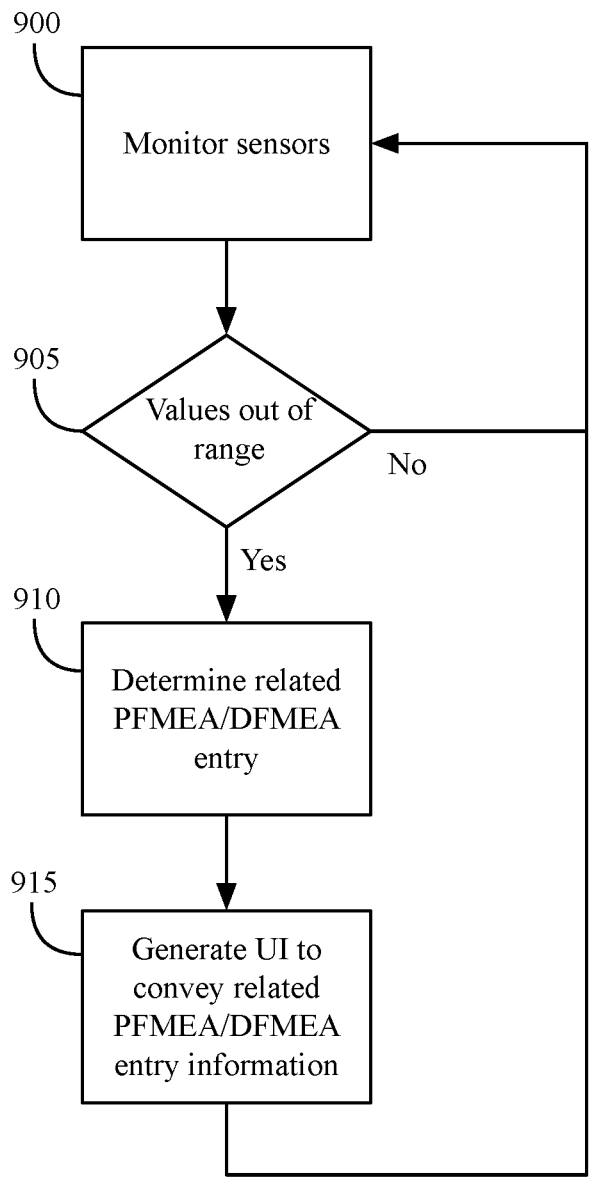
FIG. 9A illustrates operations performed by the QCS that facilitate alerting an operator to process-related issues associated with a design, in accordance with an example.

FIG. 9 illustrates an example of operations performed by the QCS 102 that facilitate alerting an operator to process-related issues associated with a design. In this regard, one or more of the operations can be implemented via instruction code, stored in the memory 127 of the QCS 102 configured to cause the processor 125 of the QCS 102 to perform the operations illustrated in the figures and discussed herein.

Operations 900 can involve monitoring, by the QCS 102, sensor data 135c received from a PDE 150. The sensor data 135c can be received from a sensor 152 that is in proximity to equipment 155 that is used in manufacturing the design.

Operation 905 can involve determining whether any sensor data 135c received from the PDE 150 is out of specification. For example, the QCS 102 can search a control plan table 800 for an entry associated with a particular sensor. The entry can specify values or ranges associated with the sensor data 135c indicative of normal operation.

If at operation 905 the sensor data 135c is determined to be invalid, then at operation 910, the QCS 102 can search for an entry in the PFMEA table 700 and/or the DFMEA table 400 that is related to the entry in the control plan table 800 determined at operation 905.

At operation 915, the QCS can generate a user interface 950 to convey information related to the entry or entries identified at operation 910. The user interface 950 can specify any aspect of information associated with the entries. For example, the user interface 950 can specify a process requirement and/or a design requirement associated with the entry or entries.

The operations can continue from operation 900.

Figure 9B:
FIG. 9B illustrates a user interface for specifying an issue related to a process, in accordance with an example.

FIG. 9B illustrates an example of the user interface 950 that can be generated in operation 914 above to convey PFMEA information related to sensor data determined to be invalid. In the example, the user interface 950 specifies a particular sensor that read invalid data (i.e., Torque Sensor xx). The control plan table 800 can have an entry associated with the sensor and the entry can be related via the object graph 200 to an entry in the PFMEA table 700. The process description, requirement and potential failure mode associated with the entry in the PFMEA table 700 can be specified in the user interface 950, as shown.

In examples where the DFMEA information is to be conveyed, the user interface can specify, for example, the design function and design requirement associated with a particular DFMEA entry.

Figure 10:
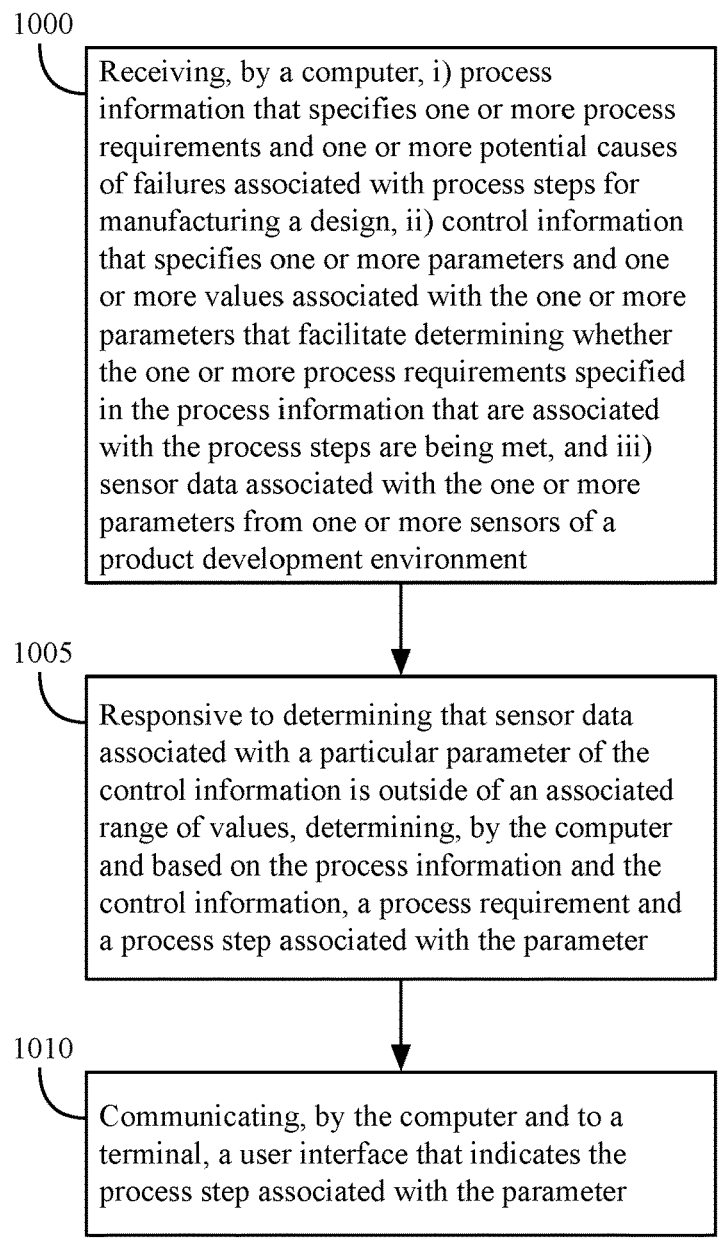
FIG. 10 illustrates a more detailed variation of the operations of FIG. 9, in accordance with an example

FIG. 10 illustrates an example of a more detailed variation of the operations of FIG. 9. Block 1000 can involve receiving, by a computer, i) process information that specifies one or more process requirements and one or more potential causes of failures associated with process steps for manufacturing a design, ii) control information that specifies one or more parameters and one or more values associated with the one or more parameters that facilitate determining whether the one or more process requirements specified in the process information that are associated with the process steps are being met, and iii) sensor data 135c associated with the one or more parameters from one or more sensors of a product development environment.

Block 1005 can involve responsive to determining that sensor data 135c associated with a particular parameter of the control information is outside of an associated range of values, determining, by the computer and based on the process information and the control information, a process requirement and a process step associated with the parameter.

Block 1010 can involve communicating, by the computer and to a terminal 104, a user interface that indicates the process step associated with the parameter.

Some examples can involve receiving, by the computer, design information that specifies one or more design requirements and potential causes of failures associated with the design, wherein a particular design requirement specified in the design information is associated with the process step. The user interface can further indicate the design requirement specified in the design information that is associated with the process step.

In some examples receiving the design information can involve receiving, by the computer and via a second user interface, a selected pre-defined design function and a selected pre-defined design requirement previously related to the design function, a potential cause of failure (PCOF) attribute, and a process link. The process link can be associated with a process step specified in the process information. The computer can add, in an object graph 200, a design failure mode and effect (DFME) node that specifies the design PCOF attribute and the process link. The computer can relate, in the object graph 200, the DFME node 205 to the selected design function and the selected design requirement, and to the design.

In some examples, receiving the design information can involve receiving, by the computer and via the second user interface, a potential failure mode attribute, a potential effect(s) of failure attribute, a current design prevention controls attribute, and a current design detection controls attribute. The computer can specify the potential failure mode attribute, the potential effect(s) of failure attribute, the current design prevention controls attribute, and the current design detection controls attribute in the DFME node 205.

Some examples can involve generating, by the computer, a design failure mode and effects analysis (DFMEA) report 135b associated with the design that specifies, for each of a plurality of DFME nodes 205 of the object graph 200 associated with the design, the design function and the design requirement related to the DFME node 205, and the potential cause of failure (PCOF) attribute, the potential failure mode attribute, the potential effect(s) of failure attribute, the current design prevention controls attribute, and the current design detection controls attribute specified in the DFME node 205.

In some examples, receiving the process information can involve receiving, by the computer and via a third user interface, a selected pre-defined process descriptor and a selected pre-defined process requirement previously related to the process descriptor, and a potential cause of failure (PCOF) attribute, and a control link. The control link is associated with a parameter specified in the control information. The computer can add, in the object graph 200, a process failure mode and effect (PFME) node that specifies the process PCOF attribute and the control link. The computer can relate, in the object graph 200, the PFME node 215 to the selected process descriptor and the selected process requirement, and to the design.

In some examples, receiving the process information can involve receiving, by the computer and via the third user interface, a potential failure mode attribute, a potential effect(s) of failure attribute, a current process prevention controls attribute, and a current process detection controls attribute. The computer can specify the potential failure mode attribute, the potential effect(s) of failure attribute, the current process prevention controls attribute, and the current process detection controls attribute in the PFME node 215.

Some examples can involve generating, by the computer, a process failure mode and effects analysis (PFMEA) report 135b associated with the design that specifies, for each of a plurality of PFME nodes 215 of the object graph 200 associated with the design, the process descriptor and the process requirement related to the PFME node 215, and the potential cause of failure (PCOF) attribute, the potential failure mode attribute, the potential effect(s) of failure attribute, the current process prevention controls attribute, and the current process detection controls attribute specified in the PFME node 215.

In some examples, receiving the process information can involve generating, by the computer, a fourth user interface that facilitates specifying a process flow diagram, wherein the process flow diagram further specifies an order of operation of pre-defined process descriptors that are selectable via the third user interface.

Figure 11:
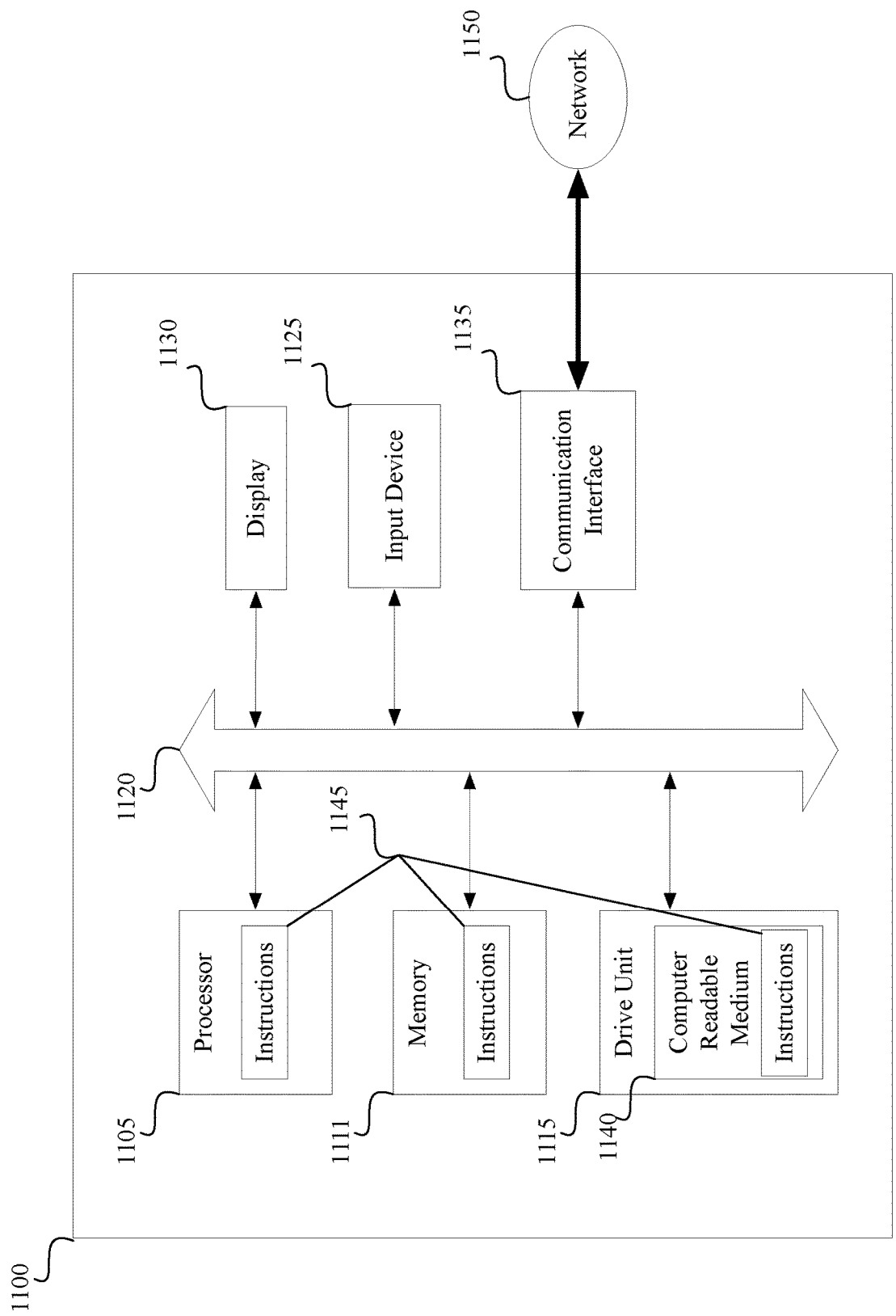
FIG. 11 illustrates a computer system that can form part of or implement any of the systems or devices of the environment, in accordance with an example.

FIG. 11 illustrates an example of a computer system 1100 that can form part of or implement any of the systems and/or devices described above. The computer system 1100 can include a set of instructions 1145 that the processor 1105 can execute to cause the computer system 1100 to perform any of the operations described above. An example of the computer system 1100 can operate as a stand-alone device or can be connected, e.g., using a network, to other computer systems or peripheral devices.

In a networked example, the computer system 1100 can operate in the capacity of a server or as a client computer in a server-client network environment, or as a peer computer system in a peer-to-peer (or distributed) environment. The computer system 1100 can also be implemented as or incorporated into various devices, such as a personal computer or a mobile device, capable of executing instructions 1145 (sequential or otherwise), causing a device to perform one or more actions. Further, each of the systems described can include a collection of subsystems that individually or jointly execute a set, or multiple sets, of instructions to perform one or more computer operations.

The computer system 1100 can include one or more memory devices 1110 communicatively coupled to a bus 1120 for communicating information. In addition, code operable to cause the computer system to perform operations described above can be stored in the memory 1110. The memory 1110 can be random-access memory, read-only memory, programmable memory, hard disk drive, or any other type of memory or storage device.

The computer system 1100 can include a display 1130, such as a liquid crystal display (LCD), a cathode ray tube (CRT), or any other display suitable for conveying information. The display 1130 can act as an interface for the user to see processing results produced by processor 1105.

Additionally, the computer system 1100 can include an input device 1125, such as a keyboard or mouse or touchscreen, configured to allow a user to interact with components of system 1100.

The computer system 1100 can also include a disk or optical drive unit 1115. The drive unit 1115 can include a computer-readable medium 1140 in which the instructions 1145 can be stored. The instructions 1145 can reside completely, or at least partially, within the memory 1110 and/or within the processor 1105 during execution by the computer system 1100. The memory 1110 and the processor 1105 also can include computer-readable media as discussed above.

The computer system 1100 can include a communication interface 1135 to support communications via a network 1150. The network 1150 can include wired networks, wireless networks, or combinations thereof. The communication interface 1135 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method comprising:
receiving, by a computer, i) process information that specifies one or more process requirements and one or more potential causes of failures associated with processes for manufacturing a design, and ii) control information that specifies one or more parameters and one or more values associated with the one or more parameters that facilitate determining whether the one or more process requirements specified in the process information that are associated with the processes are being met wherein the process information and the control information include multiple entries and each entry includes multiple data fields;
digitally linking entries of i) the process information to entries of ii) the control information within memory of the computer via values of identifier fields of the process information and the control information, wherein an entry of the process information that is associated with an entry of the control information has a same value of an identifier field;
monitoring sensor data received from a product development environment, wherein the sensor data is associated with the one or more parameters from one or more sensors of the product development environment that is within distance to equipment used in manufacturing the design;
comparing, by the computer, the sensor data with a control plan table specifying sensor values per parameters for digitally linked process and control information for manufacturing the design to determine whether any of the sensor data is outside of an associated range of values;
for particular sensor data determined to be outside the associated range of values, determining, by the computer and based on accessing linked entries of the process information and the control information in the memory, a process requirement and a process in the process information associated with the particular sensor data;
generating, by the computer, a user interface that displays a type of sensor outputting the particular sensor data, the process requirement and the process for a particular parameter of the control information, and a potential cause of failure associated with the process; and
communicating, by the computer and to a terminal, the user interface.

2. The computer-implemented method according to claim 1, further comprising:
receiving, by the computer, design information that specifies one or more design requirements and potential causes of failures associated with the design, wherein a particular design requirement specified in the design information is associated with the process,
wherein the user interface further indicates the design requirement specified in the design information that is associated with the process.

3. The computer-implemented method according to claim 2, wherein receiving the design information further comprises:
receiving, by the computer and via a second user interface, a selected pre-defined design function and a selected pre-defined design requirement previously related to the design function, a potential cause of failure (PCOF) attribute;
adding, by the computer and in the object graph, a design failure mode and effect (DFME) node that specifies the design PCOF attribute; and
relating, in the object graph, the DFME node to the selected design function and the selected design requirement, and to the design.

4. The computer-implemented method according to claim 3, wherein receiving the design information further comprises:
receiving, by the computer and via the second user interface, a potential failure mode attribute, a potential effect(s) of failure attribute, a current design prevention controls attribute, and a current design detection controls attribute; and
specifying, by the computer, the potential failure mode attribute, the potential effect(s) of failure attribute, the current design prevention controls attribute, and the current design detection controls attribute in the DFME node.

5. The computer-implemented method according to claim 4, further comprising:
generating, by the computer, a design failure mode and effects analysis (DFMEA) report associated with the design that specifies, for each of a plurality of DFME nodes of the object graph associated with the design, the design function and the design requirement related to the DFME node, and the potential cause of failure (PCOF) attribute, the potential failure mode attribute, the potential effect(s) of failure attribute, the current design prevention controls attribute, and the current design detection controls attribute specified in the DFME node.

6. The computer-implemented method according to claim 3, wherein receiving the process information further comprises:
receiving, by the computer and via the second user interface, a selected pre-defined process descriptor and a selected pre-defined process requirement previously related to the process descriptor, and a potential cause of failure (PCOF) attribute;
adding, by the computer and in the object graph, a process failure mode and effect (PFME) node that specifies the process PCOF attribute; and
relating, in the object graph, the PFME node to the selected process descriptor and the selected process requirement, and to the design.

7. The computer-implemented method according to claim 6, wherein receiving the process information further comprises:
receiving, by the computer and via the second user interface, a potential failure mode attribute, a potential effect(s) of failure attribute, a current process prevention controls attribute, and a current process detection controls attribute; and
specifying, by the computer, the potential failure mode attribute, the potential effect(s) of failure attribute, the current process prevention controls attribute, and the current process detection controls attribute in the PFME node.

8. The computer-implemented method according to claim 7, further comprising:
generating, by the computer, a process failure mode and effects analysis (PFMEA) report associated with the design that specifies, for each of a plurality of PFME nodes of the object graph associated with the design, the process descriptor and the process requirement related to the PFME node, and the potential cause of failure (PCOF) attribute, the potential failure mode attribute, the potential effect(s) of failure attribute, the current process prevention controls attribute, and the current process detection controls attribute specified in the PFME node.

9. The computer-implemented method according to claim 6, wherein receiving the process information further comprises:
generating, by the computer, a third user interface that facilitates specifying a process flow diagram, wherein the process flow diagram further specifies an order of operation of pre-defined process descriptors that are selectable via the third user interface.

10. The computer-implemented method according to claim 1, further comprising:
calculating an overall score, based on a failure severity rating multiplied by a failure occurrence rate for the process in the process information associated with the particular parameter of the control information; and
inputting the overall score in a field of the entry for the process in the process information associated with the particular parameter of the control information.

11. The computer-implemented method according to claim 1, further comprising:
tracing the particular sensor data that is outside the associated range of values to the process requirement specified in the design.

12. The computer-implemented method according to claim 1, further comprising:
mapping the potential cause of failure associated with the process to a process detection control; and
collecting additional sensor data following performance of the process detection control.

13. A system comprising:
a memory that stores instruction code; and
a processor in communication with the memory, wherein the instruction code is executable by the processor to perform operations comprising:
receiving i) process information that specifies one or more process requirements and one or more potential causes of failures associated with processes for manufacturing a design, and ii) control information that specifies one or more parameters and one or more values associated with the one or more parameters that facilitate determining whether the one or more process requirements specified in the process information that are associated with the processes are being met wherein the process information and the control information include multiple entries and each entry includes multiple data fields;
digitally linking entries of i) the process information to entries of ii) the control information within memory of the computer via values of identifier fields of the process information and the control information, wherein an entry of the process information that is associated with an entry of the control information has a same value of an identifier field;
receiving sensor data associated with the one or more parameters from one or more sensors of a product development environment;
monitoring sensor data received from a product development environment, wherein the data is associated with the one or more parameters from one or more sensors of the product development environment that is within distance to equipment used in manufacturing the design;
comparing the sensor data with a control plan table specifying sensor values per parameters for digitally linked process and control information for manufacturing the design to determine whether any of the sensor data is outside of an associated range of values;
for particular sensor data determined to be outside the associated range of values, determining, based on accessing linked entries of the process information and the control information in the memory, a process requirement and a process in the process information associated with the particular sensor data;
generating a user interface that displays a type of sensor outputting the particular sensor data, the process requirement and the process for a particular parameter of the control information, and a potential cause of failure associated with the process; and
communicating, to a terminal, the user interface.

14. The system according to claim 13, wherein the instruction code is executable by the processor to perform further operations comprising:
receiving design information that specifies one or more design requirements and potential causes of failures associated with the design, wherein a particular design requirement specified in the design information is associated with the process,
wherein the user interface further indicates the design requirement specified in the design information that is associated with the process.

15. The system according to claim 14, wherein in receiving the design information, the instruction code is executable by the processor to perform further operations comprising:
receiving, via a second user interface, a selected pre-defined design function and a selected pre-defined design requirement previously related to the design function, a potential cause of failure (PCOF) attribute;
adding, in the object graph, a design failure mode and effect (DFME) node that specifies the design PCOF attribute; and
relating, in the object graph, the DFME node to the selected design function and the selected design requirement, and to the design.

16. The system according to claim 15, wherein in receiving the design information, the instruction code is executable by the processor to perform further operations comprising:
receiving, via the second user interface, a potential failure mode attribute, a potential effect(s) of failure attribute, a current design prevention controls attribute, and a current design detection controls attribute; and
specifying the potential failure mode attribute, the potential effect(s) of failure attribute, the current design prevention controls attribute, and the current design detection controls attribute in the DFME node.

17. The system according to claim 16, wherein the instruction code is executable by the processor to perform further operations comprising:

generating a design failure mode and effects analysis (DFMEA) report associated with the design that specifies, for each of a plurality of DFME nodes of the object graph associated with the design, the design function and the design requirement related to the DFME node, and the potential cause of failure (PCOF) attribute, the potential failure mode attribute, the potential effect(s) of failure attribute, the current design prevention controls attribute, and the current design detection controls attribute specified in the DFME node.

18. The system according to claim 15, wherein in receiving the process information, the instruction code is executable by the processor to perform further operations comprising:
receiving, via the second user interface, a selected predefined process descriptor and a selected pre-defined process requirement previously related to the process descriptor, and a potential cause of failure (PCOF) attribute;
adding, in the object graph, a process failure mode and effect (PFME) node that specifies the process PCOF attribute; and
relating, in the object graph, the PFME node to the selected process descriptor and the selected process requirement, and to the design.

19. The system according to claim 18, wherein in receiving the process information, the instruction code is executable by the processor to perform further operations comprising:
receiving, via the second user interface, a potential failure mode attribute, a potential effect(s) of failure attribute, a current process prevention controls attribute, and a current process detection controls attribute; and
specifying the potential failure mode attribute, the potential effect(s) of failure attribute, the current process prevention controls attribute, and the current process detection controls attribute in the PFME node.

20. The system according to claim 19, wherein the instruction code is executable by the processor to perform further operations comprising:
generating a process failure mode and effects analysis (PFMEA) report associated with the design that specifies, for each of a plurality of PFME nodes of the object graph associated with the design, the process descriptor and the process requirement related to the PFME node, and the potential cause of failure (PCOF) attribute, the potential failure mode attribute, the potential effect(s) of failure attribute, the current process prevention controls attribute, and the current process detection controls attribute specified in the PFME node.

21. The system according to claim 18, wherein in receiving the process information, the instruction code is executable by the processor to perform further operations comprising:
generating a third user interface that facilitates specifying a process flow diagram, wherein the process flow diagram further specifies an order of operation of pre-defined process descriptors that are selectable via the third user interface.

22. A non-transitory computer-readable medium having stored thereon instruction code, wherein the instruction code is executable by a processor of a computer to perform operations comprising:
receiving i) process information that specifies one or more process requirements and one or more potential causes of failures associated with processes for manufacturing a design, and ii) control information that specifies one or more parameters and one or more values associated with the one or more parameters that facilitate determining whether the one or more process requirements specified in the process information that are associated with the processes are being met wherein the process information and the control information include multiple entries and each entry includes multiple data fields;
digitally linking entries of i) the process information to entries of ii) the control information within memory of the computer via values of identifier fields of the process information and the control information, wherein an entry of the process information that is associated with an entry of the control information has a same value of an identifier field;
monitoring sensor data received from a product development environment, wherein the sensor data is associated with the one or more parameters from one or more sensors of the product development environment that is within distance to equipment used in manufacturing the design;
comparing the sensor data with a control plan table specifying sensor values per parameters for digitally linked process and control information for manufacturing the design to determine whether any of the sensor data is outside of an associated range of values;
for particular sensor data determined to be outside the associated range of values, determining, based on accessing linked entries of the process information and the control information in the memory, a process requirement and a process in the process information associated with the particular sensor data;
generating a user interface that displays a type of sensor outputting the particular sensor data, the process requirement and the process for a particular parameter of the control information, and a potential cause of failure associated with the process; and
communicating, to a terminal, the user interface.

23. The non-transitory computer-readable medium according to claim 22, wherein the instruction code is executable by the processor of the computer to perform further operations comprising:
receiving design information that specifies one or more design requirements and potential causes of failures associated with the design, wherein a particular design requirement specified in the design information is associated with the process; and
wherein the user interface further indicates the design requirement specified in the design information that is associated with the process.

* * * * *